US010656835B2

(12) United States Patent
Auvenshine et al.

(10) Patent No.: US 10,656,835 B2
(45) Date of Patent: May 19, 2020

(54) DATA COMPRESSION DETERMINATION FOR STORAGE AREA NETWORKS

(71) Applicant: International Business Machines Corporation, Armonk, NY (US)

(72) Inventors: John J. Auvenshine, Tucson, AZ (US); Laura Richardson, Tampa, FL (US); Dave Aime Desire Kodjo, Sainte-Marthe-sur-le-Lac (CA); Lisa M. Chavez, Placitas, NM (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 15/969,902

(22) Filed: May 3, 2018

(65) Prior Publication Data

US 2019/0339876 A1 Nov. 7, 2019

(51) Int. Cl.
*G06F 12/00* (2006.01)
*G06F 3/06* (2006.01)

(52) U.S. Cl.
CPC .......... *G06F 3/0608* (2013.01); *G06F 3/067* (2013.01); *G06F 3/0644* (2013.01); *G06F 3/0647* (2013.01); *G06F 3/0653* (2013.01); *G06F 3/0665* (2013.01)

(58) Field of Classification Search
None
See application file for complete search history.

(56) References Cited

U.S. PATENT DOCUMENTS

| 8,818,964 B2 | 8/2014 | Tevis et al. |
| 2013/0332610 A1* | 12/2013 | Beveridge ........... G06F 9/45558 709/226 |
| 2014/0095450 A1 | 4/2014 | Marwah et al. |
| 2017/0235513 A1 | 8/2017 | Zhang |
| 2017/0371580 A1* | 12/2017 | Kowles ................. G06F 3/0673 |

* cited by examiner

*Primary Examiner* — Jason W Blust
(74) *Attorney, Agent, or Firm* — Schmeiser, Olsen & Watts, LLP; Maeve Carpenter

(57) ABSTRACT

A method, computer system, and computer program product for determining whether data compression should be performed at a storage virtualization layer or a backend layer, within a storage area network, including assessing a volume of data to decide whether the volume of data should be compressed or is already compressed, and in response to deciding that the volume of data should be compressed: checking whether a restriction exists on the volume of data, and in response to deciding that the volume of data is already compressed: determining that the volume of data already compressed should be uncompressed based on at least one metric.

20 Claims, 7 Drawing Sheets

DATA COMPRESSION DETERMINATION FOR STORAGE AREA NETWORKS

FIELD OF TECHNOLOGY

The present invention relates to systems and methods for determining whether data compression should be performed at a storage virtualization layer or a backend layer, within a storage area network.

BACKGROUND

A complex storage environment may involve a storage virtualization layer and one or more backend storage devices behind the storage virtualization layer. Both the backend layer and the virtualization layer may offer data compression, and each layer has drawbacks and limitations when it comes to data compression, which can impact data compression and a performance of the overall storage system.

SUMMARY

An aspect of this invention relates to a method, and associated computer system and computer program product, for determining whether data compression should be performed at a storage virtualization layer or a backend layer, within a storage area network. A processor of a computing system assesses a volume of data to decide whether the volume of data should be compressed or is already compressed. In response to deciding that the volume of data should be compressed, checking whether a restriction exists on the volume of data. The volume of data is transformed by compressing the volume at the storage virtualization layer of the storage area network when the restriction exists. The volume of data is migrated to a natively compressed pool for data compression at the backend layer of the storage area network when the restriction does not exist. In response to deciding that the volume of data is already compressed, determining that the volume of data already compressed should be uncompressed based on at least one metric. The volume of data already compressed is uncompressed at the storage virtualization layer when the volume of data already compressed was compressed at the storage virtualization layer of the storage area network. The volume of data already compressed is migrated to a natively uncompressed pool for uncompressing the volume of data already compressed at the backend layer of the storage area network when the volume of data already compressed was compressed at the backend layer.

DETAILED DESCRIPTION

Current solutions to data compression in a complex storage area network (SAN) are built around fixed policies depending on some characteristics of the SAN. For example, all data compression will happen at the virtualization layer or all compression will happen at the backend layer. The fixed policy of performing data compression either all on the virtualization layer or all on the backend layer limits a number of compressed volumes of data, and fails to take advantage of all capabilities of the SAN. Thus, a need exists for determining whether data compression should be performed at a storage virtualization layer or a backend layer, within a storage area network.

Figure 1:
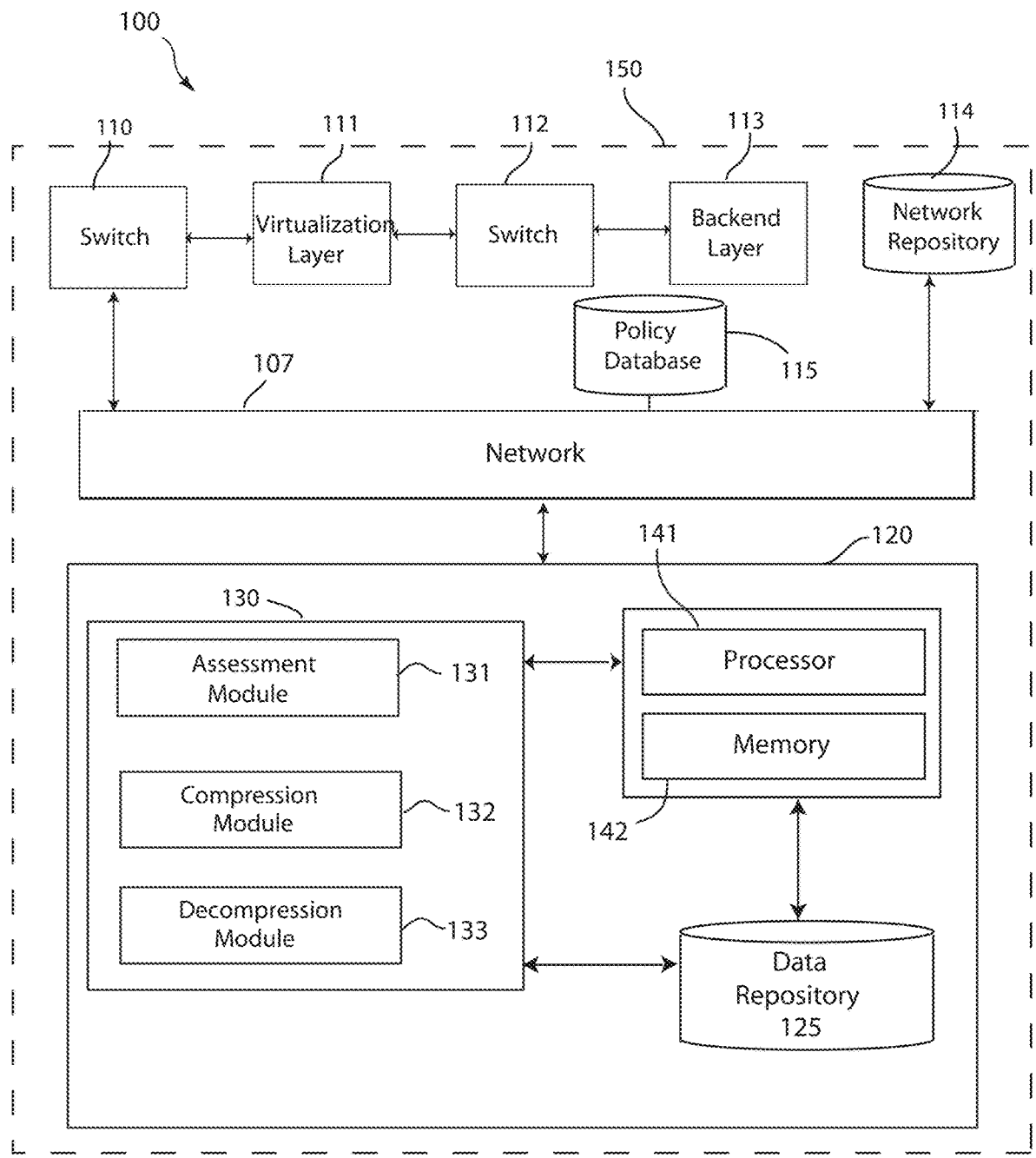
FIG. 1 depicts a block diagram of a SAN data compression determination system, in accordance with embodiments of the present invention.

Referring to the drawings, FIG. 1 depicts a block diagram of a SAN data compression determination system 100, in accordance with embodiments of the present invention. Embodiments a SAN data compression determination system 100 may be described as a system for determining whether data compression, both compression and uncompression, should occur at a storage virtualization layer 111 or a backend layer 113 of a storage area network, such as SAN 150. The SAN data compression determination system 100 may use one or more compression policies stored in one or more compression policy databases 115 in a storage virtualization environment to decide what data to compress at the virtualization layer 111 and what data to compress at the backend layer 113. In other words, the SAN data compression determination system 100 may algorithmically determine whether a given data volume needing compression should be compressed at the virtualization layer 111 or at the backend layer 113 of the SAN 150. Embodiments of the SAN data compression determination system 100 may provide a real-time data compression management of the SAN 150.

Figure 2:
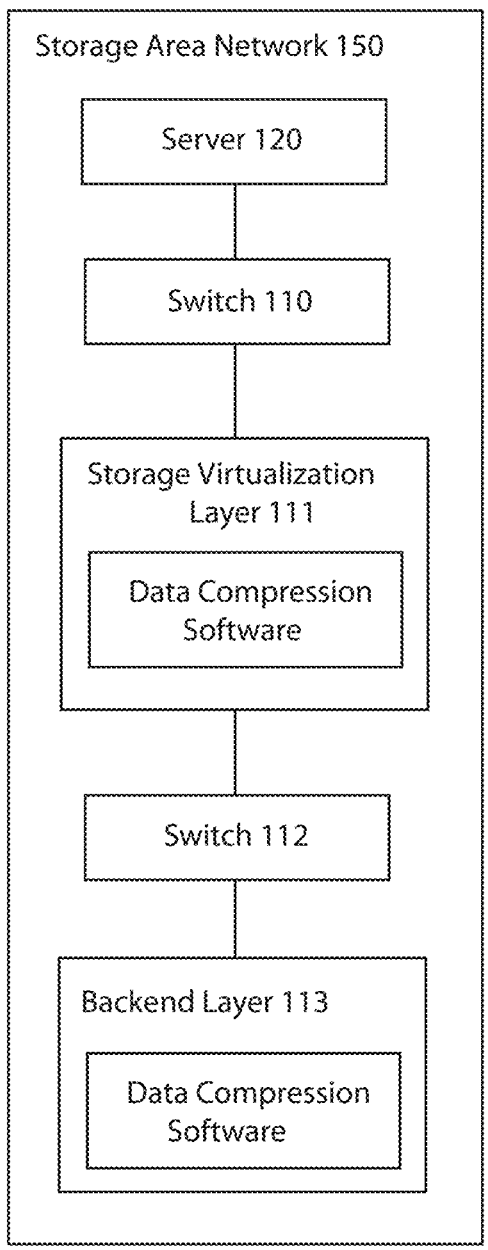
FIG. 2 depicts a schematic view of a storage area network, in accordance with embodiments of the present invention.

FIG. 2 depicts a schematic view of a storage area network 150, in accordance with embodiments of the present invention. Embodiments of the SAN 150 may comprise a server 120 (e.g. computing system 120), a switch 110, a storage virtualization layer 111, a switch 112, and backend layer 113. Embodiments of the switch 110 may be coupled to a computing system 120 over a network 107, as shown schematically in FIG. 1. For example, the computing system 120 may communicate with the virtualization layer 111 via switch 110. Embodiments of the virtualization layer 111 may include data compression software for compressing data and uncompressing data. Switch 112 may communicatively couple the virtualization layer 111 to the backend layer 113. Embodiments of the backend layer 113 may also include data compression software for compressing and uncompressing data. Embodiments of the SAN 150 may include a plurality of servers 120 and a plurality of switches 110, and/or a plurality of storage virtualization devices and a plurality of backend storage devices, depending on a size and complexity of the SAN 150.

Referring back to FIG. 1, embodiments of the computing system 120 may be connected to other components of the SAN 150, such as switch 110, over network 107. A network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, storage area networks (SAN), cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computer system 120, switches 110, 112, virtualization layer 111m and backend layer 113, a connection to one or more network accessible knowledge bases containing information of one or more users, network repositories 114 or other systems connected to the network 107 that may be considered nodes of the network 107. In some embodiments, where the computing system 120 or network repositories 114 allocate resources to be used by the other nodes of the network 107, the computer system 120 and network repository 114 may be referred to as servers.

The network repository 114 may be a data collection area on the network 107 which may back up and save all the data transmitted back and forth between the nodes of the network 107. For example, the network repository 114 may be a data center saving and cataloging data compression policies, locations, etc. to generate both historical and predictive reports regarding a data compression of volumes of data within the SAN 150. In some embodiments, a data collection center housing the network repository 114 may include an analytic module capable of analyzing each piece of data being stored by the network repository 114. Further, the computer system 120 may be integrated with or as a part of the data collection center housing the network repository 114. In some alternative embodiments, the network repository 114 may be a local repository (not shown) that is connected to the computer system 120.

Referring still to FIG. 1, embodiments of the computing system 120 may include a data compression determination application 130, which includes an assessment module 131, a compression module 132, and an decompression module 133. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the assessment module 131 may include one or more components of hardware and/or software program code for assessing a volume of data to decide whether the volume of data should be compressed or is already compressed. The assessment module 131 may perform a policy assessment of the volume of data in accordance with compression policies stored in a compression policy database 115 within the storage area network 150. Embodiments of the assessment module 131 may determine, for each volume of data, if the volume of data has already been compressed (e.g. in a previous run) and/or if the volume of data should be compressed or not. For volumes of data that are already compressed, the assessment module 131 may be able to detect that the volume has been previously compressed, and determine that the current volume of data has already been compressed. A compression policy may be built to be applied by the assessment module 131 for determining whether the volume of data should be compressed. For instance, the compression policy may have a predetermined global compression threshold (e.g. a specific size), that if the volume exceeds, may be classified by the assessment module 131 as needing to be compressed, and if the volume does not exceed, may be classified by the assessment module 131 as not needing to be compressed. The compression policy may also indicate that only data associated with a particular mdisk group tier level of the virtualization layer 111 should be compressed, or volumes having more or less than a threshold IO rate or IO density or compression ratio should be compressed. For example, for virtualization layer of the SAN 150, a mdisk group per tier level may be classified, source and target mdisk groups may be identified and marked for backend or virtualization layer decompression or compression. Other constraints may be utilized and factored into the compression policy used for assessing whether a volume of data should be compressed.

In an exemplary embodiment, a compression ratio of the volume of data may be estimated by the assessment module 131. The compression ratio, as it relates to embodiments herein, may be understood as a size of the volume when compressed divided by a size of the volume when uncompressed. Thus, the lower the compression ratio, the better compression is working, which may be the reverse of a typical compression ratio as understood in the industry, wherein the typical compression ratio is the reverse (e.g. higher is better) because the typical compression ratio is the uncompressed size divided by the compressed size.

The assessment module 131 may then determine that the compression ratio of the volume of data is below a predetermined threshold. If the compression ratio is above the predetermined threshold associated with a compression ratio, then the assessment module 131 may determine that no further processing is required for the given volume, and that the volume should not be compressed. If the compression ratio is below the predetermined threshold associated with a compression ratio, then the assessment module 131 may determine that that the volume should be compressed. In further exemplary embodiments, the assessment module 131 of the computing system 120 may use a comprestimator to estimate a compression ratio for the volume of data. In embodiments where a comprestimator is not supported, the assessment module 131 may use a historical compression ratio or nearest neighbors (e.g. another volume of data attached to the same host), and may use the last compression ratio if not older than a predefined period of time (e.g. 30 days) as the estimated compression ratio of the volume of data. In yet another embodiment, the assessment module 131 may also use the last two compression ratios and a linear regression model to estimate the compression ratio of the volume. The volume of data may be selected for compression if the estimated compression ratio is below the global compression threshold, set by the compression policies. If there are no historical or neighbor data for the estimation of the compression ratio of the volume of data, the assessment module 131 may postpone the decision whether to compress, or may select the volume for compression. Accordingly, embodiments of the assessment module 131 may determine that the volume of data should be or should not be compressed based on one or more compression policies accessible in the compression policy database 115.

With continued reference to FIG. 1, embodiments of the computing system 120 may also include a compression module 132. Embodiments of the default password identifying module 132 may include one or more components of hardware and/or software program code for checking whether a restriction exists on the volume of data, in response to the assessment module 131 deciding, determining, etc. that the volume of data should be compressed. Embodiments of a restriction may be a condition, that if the condition occurs, the volume of data cannot be compressed at the storage virtualization layer 111. The condition representing a restriction may be that the volume of data is mirrored on another layer within the storage area network 150, the volume of data exceeds a predetermined data volume, the number of compressed data volumes at the virtualization layer exceeds the licensed maximum, the total size of compressed data volumes at the virtualization layer exceeds the recommended maximum for the virtualization hardware, performance monitoring of the virtualization layer has indicated it is at or above a predetermined loading threshold, and/or a combination thereof. For instance, if the volume of data has already been mirrored or copied, then the compression module 132 may not compress the volume of data at the virtualization layer 111. Embodiments of the restriction may also be a rule associated with the compression policy that provides a reason why a particular volume of data should not be compressed at the virtualization layer, which may not relate to mirroring. Various restrictions may be placed into effect by the compression module 131 for determining to compress the volume of data at the backend layer 113 and not the virtualization layer 111. In an exemplary embodiment, the compression module 132 may, after the applied compression policy has indicated that the volume should be compressed, run a placement algorithm to select a target mdisk group with a smallest utilization value based on an estimated IO rate or max IO rate. If a target mdisk is found, then the compression module 132 may conclude that a restriction exists, and not compress the volume at the virtualization layer 111.

If the compression module 132 determines that a restriction exists, then the compression module 132 may migrate the volume of data to a natively compressed pool for data compression at the backend layer 113 of the storage area network 150. For example, the compression module 132 of the computing system 120 may send a migration command to the storage virtualization layer 111 for migration of the volume of data to the natively compressed pool for data compression at the backend layer 113 using the data compression software on the backend layer 113, for storage on one or more backend storage devices. The compression module 132 may control an amount of operations being performed by the storage virtualization layer 111. For instance, when a maximum number of concurrent operations for the storage virtualization layer 111 is reached, the compression module 132 may wait until completion of the previous migration before sending another migration command to the storage virtualization layer 111. Accordingly, the compression module 132 may determine whether the volume selected for compression should be compressed at the storage virtualization layer 111 or at the backend layer 113 of the SAN 150 based on whether the volume of data is restricted from being stored on the virtualization layer 111, wherein the restriction may be a condition, a rule, a constraint, and the like, derived from a compression policy stored on the compression policy database 115.

Embodiments of the computing system 120 may include a decompression module 133. Embodiments of the decompression module 133 may include one or more components of hardware and/or software program code for determining that the volume of data already compressed should be uncompressed based on at least one metric, in response to deciding that the volume of data is already compressed. For instance, embodiments of the decompression module 133 may analyze, monitor, evaluate, examine, etc. the volume of data that is already compressed within the SAN 150, to determine whether the volume of data should remain compressed or should be decompressed/uncompressed, based on at least one metric. Embodiments of the at least one metric may be a ratio change of the volume of data already compressed, and/or a performance problem of the volume of data already compressed. The decompression module 133 may analyze a ratio change of the already compressed volume, wherein the ratio change refers to the ratio coming out of the compression (i.e. the input size compared to an output size of the compression of the compressed volume). Depending on the ratio change, the decompression module 133 may determine that the amount of storage saved by compression may be small or may be significant. Moreover, the decompression module 133 may analyze a performance problem of the compressed volume of data. For example, there may be a performance penalty for decompressing data because when the data is read, the data is run through an algorithm before the data can actually be used, which slows down the process. How much the process of running the data through an algorithm slows the process of reading the data depends on the type of data. Therefore, by analyzing the ratio change (e.g. how much space is being saved) and a performance (e.g. how much time/operations are being used to read the compressed data after compression), it may be beneficial to decompress the already compressed data. For example, if a compressed volume of data takes longer to read from a compressed state than a decompressed state, and not much storage space is saved based on the ratio change, the decompression module 133 may determine that the compressed volume of data should be decompressed. However, if the decompression module 133 determines from the ratio change that significant storage space is saved by compression (e.g. volume of data that includes redundancy), and the performance problem with reading the volume of data from the compressed state does not outweigh the storage saving, then the decompression module 133 may elect to keep the volume of data in the compressed state. Accordingly, embodiments of the decompression module 133 may determine whether an already compressed volume of data should remain compressed, or if the volume of data should be uncompressed, based on the ratio change of the compressed volume and a performance penalty when reading the compressed data.

In response to determining that the compressed volume should be uncompressed, the decompression module 133 may determine how the volume of data was compressed initially. The compressed volume of data may be undeployed to determine how the volume of data was compressed. Further, embodiments of the decompression module 133 may determine where the compressed volume was initially compressed. For instance, the decompression module 133 may determine whether the compressed volume selected for decompression was compressed at the storage virtualization layer 111 or the backend layer 113. The decompression module 133 may uncompress the volume of data already compressed at the storage virtualization layer 111 when the volume of data already compressed was compressed at the storage virtualization layer 111 of the storage area network 150. Conversely, the decompression module 133 may migrate the volume of data already compressed to a natively uncompressed pool for uncompressing the volume of data already compressed at the backend layer 113 of the storage area network 150 when the volume of data already compressed was compressed at the backend layer 113. The decompression module 133 may control an amount of operations being performed by the storage virtualization layer 111. For instance, when a maximum number of concurrent operations for the storage virtualization layer 111 is reached, the decompression module 132 may wait until completion of the previous migration before sending another migration command to the storage virtualization layer 111.

Referring still to FIG. 1, embodiments of the computer system 120 may be equipped with a memory device 142 which may store compression policies, restrictions, rules, and the like, and a processor 141 for implementing the tasks associated with the SAN data compression determination system 100. Furthermore, various tasks and specific functions of the modules of the computing system 120 may be performed by additional modules, or may be combined into other module(s) to reduce the number of modules. Further, embodiments of the computer or computing system 120 may comprise specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

Moreover, embodiments of the SAN data compression determination system 100 may improve the storage area network environment by algorithmically determining whether volumes of data should be compressed or decompressed at a virtualization layer 111 or a backend layer 113. For example, compressed data may be a good candidate for compression (i.e. based on ratio change and low performance problems) at an initial time of compression, but may become a bad candidate for compression over time, as new data is added to the compressed volume of data. The SAN data compression determination system 100 analyzes the already compressed data after initial compression and may determine that the compressed data is actually causing performance issues and adding time for reading the compressed data, such that it would be actually be better for performance of the overall storage network system if the compressed data would be uncompressed. This is a technical solution to a technical problem because the ratio change and performance problems relating to the compression of data change over time, causing slower read times for data in the SAN 150. By deciding to uncompress data already compressed can improve the read times for the end user operating/monitoring the storage area network. Further, determining which layer (e.g. storage virtualization layer 111 or backend layer 113 of SAN 150) overcomes technical limitations of the virtualization layer 111 and the backend layer 113, and takes advantage of the technical benefits for data compression at each layer. A decision to compress or decompress data at the virtualization layer 111 or at the backend layer 113 involves evaluating technical properties to influence the decision, that provides significant technical advantages to storage area networks, such as improves reading/writing speed, more efficient use of storage space on one or more storage devices associated with the storage area network, and a more stable storage environment.

Figure 3:
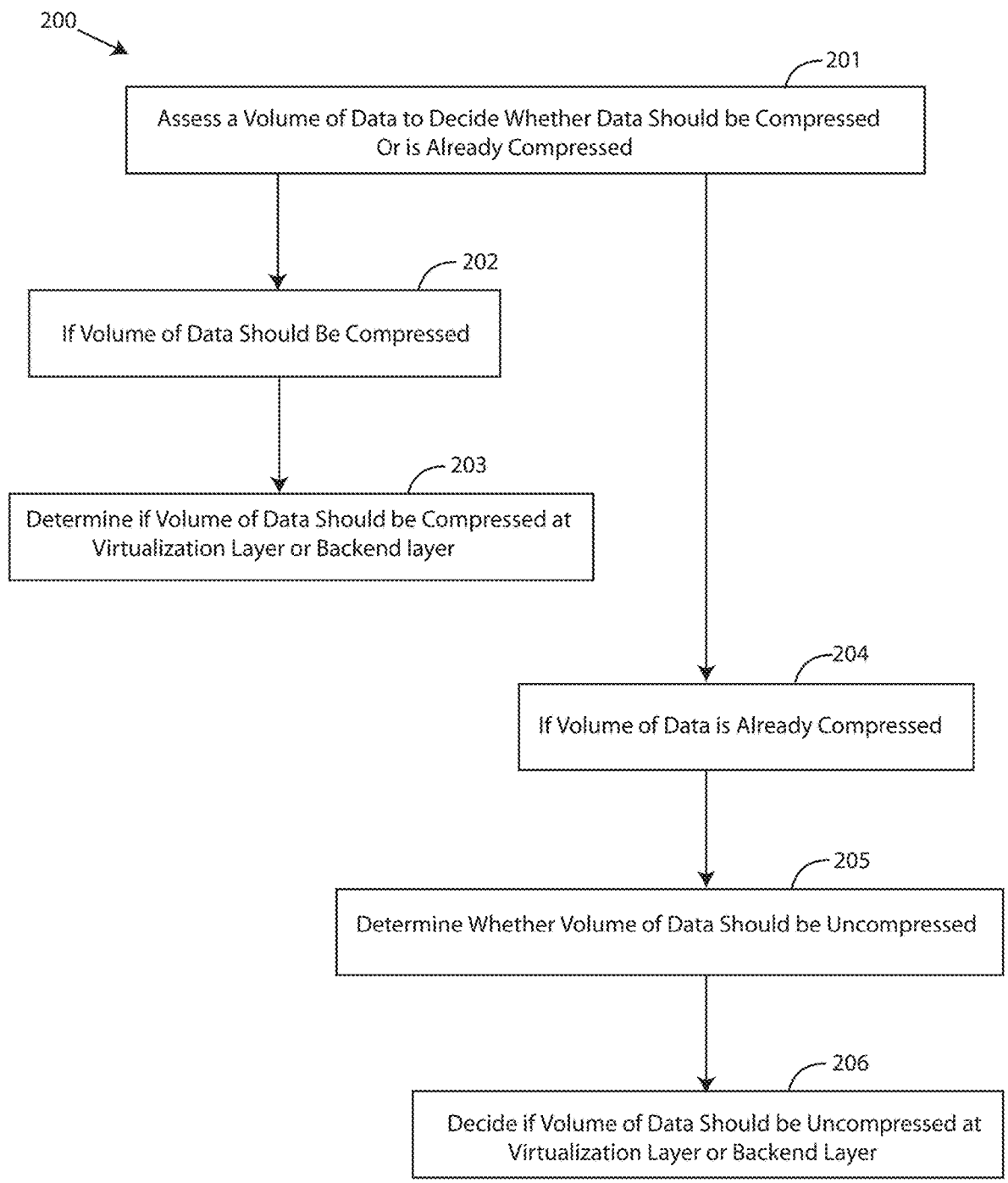
FIG. 3 depicts a flowchart of a method for determining whether data compression should be performed at a storage virtualization layer or a backend layer, within a storage area network, in accordance with embodiments of the present invention.

Referring now to FIG. 3, which depicts a flow chart of a method 200 for determining whether data compression should be performed at a storage virtualization layer or a backend layer, within a storage area network, in accordance with embodiments of the present invention. One embodiment of a method 200 or algorithm that may be implemented for determining whether data compression should be performed at a storage virtualization layer or a backend layer, within a storage area network in accordance with the SAN data compression determination system 100 described in FIG. 1 using one or more computer systems as defined generically in FIG. 5 below, and more specifically by the specific embodiments of FIG. 1.

Embodiments of the method 200 for determining whether data compression should be performed at a storage virtualization layer or a backend layer, within a storage area network may begin at step 201 wherein a volume of data is assessed to decide whether the volume of data should be compressed or is already compressed. Step 202 indicates that the volume of data should be compressed. Step 203 determines if volume of data should be compressed at the virtualization layer 111 or the backend layer 113. Step 204 indicates that the volume of data is already compressed. Step 205 determines whether the compressed volume of data should be uncompressed. Step 206 decides whether the compressed volume of data should be compressed at the virtualization layer 111 or the backend layer 113.

Figure 4:
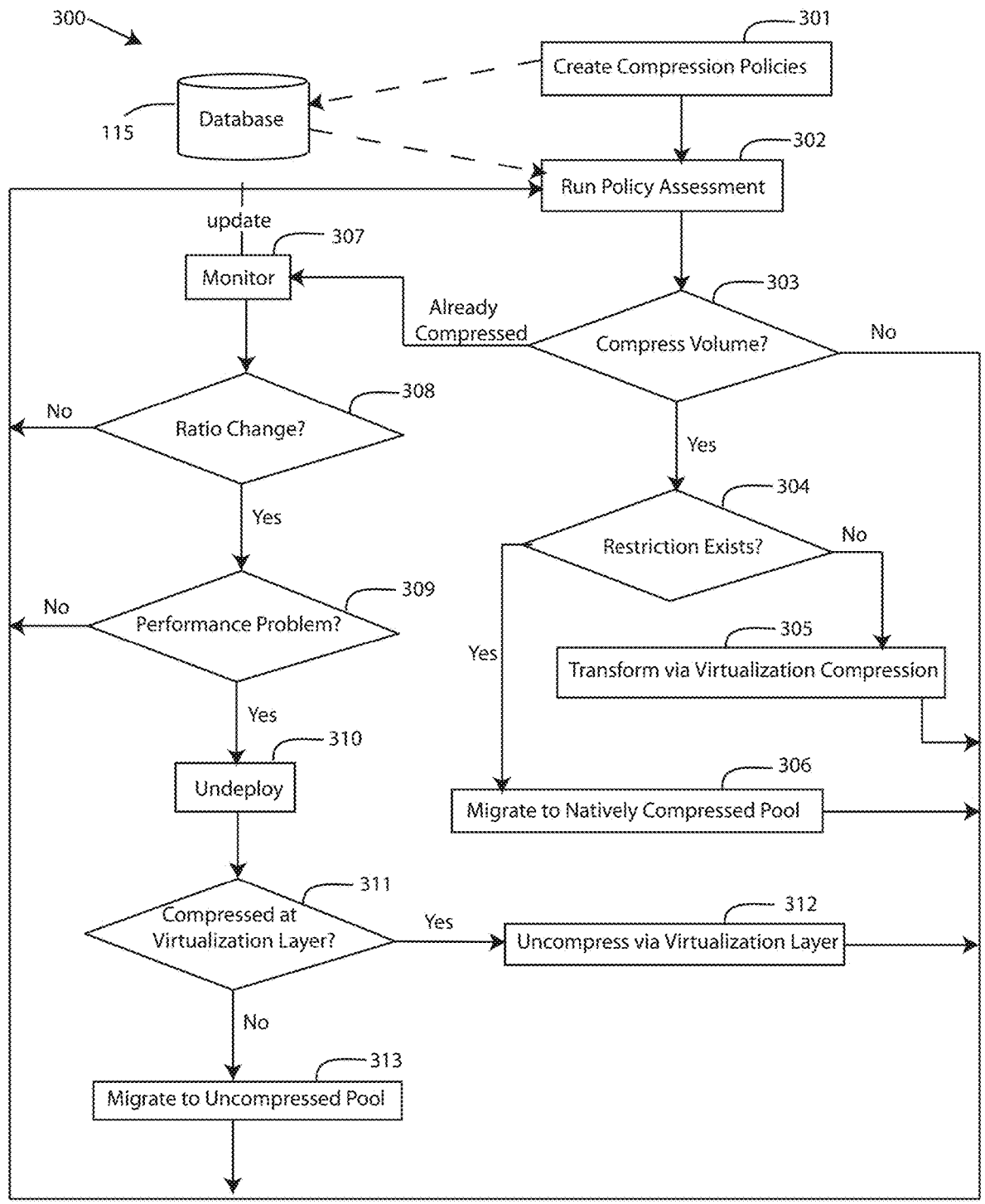
FIG. 4 depicts a detailed flowchart of the method of FIG. 3, in accordance with embodiments of the present invention.

FIG. 4 depicts a detailed flow chart 300 of the method of FIG. 3, in accordance with embodiments of the present invention. Step 301 creates compression policies, which may be stored in a compression policy database 115. Step 302 runs the policy assessment for each volume of data in the storage area network 150. Step 303 determines whether the volume of data should be compressed or is already compressed. The decision to compress the volume of data may be dependent on an estimated compression ratio being above or below a global threshold, as described supra. If the volume of data is not selected to be compressed and is not already compressed, the method 300 returns to step 302 for the next volume of data. If the volume of data is selected to be compressed, then step 304 determines whether a restriction exists on the volume of data. A restriction can be a rule or condition that may be met according to compression policies for not compressing at the virtualization layer 111. If no restriction exists, then step 305 transforms the volume of data by compressing the volume of data via virtualization layer compression at the virtualization layer 111. If a restriction exists, then step 306 migrates the volume of data to the natively compressed pool for data compression at the backend layer 113. Returning to step 303, if the volume of data is already compressed, then step 307 begins a monitoring or reevaluation process on the compressed volume of data. Step 308 analyzes a ratio change of the already compressed volume of data to determine a storage space savings and/or data speed savings/increase. If the ratio change indicates a significant storage savings, then the method 300 may continue to step 302. If the ratio change indicates a moderate or low storage savings, then step 309 analyzes a performance problem of the volume of data being compresses. Alternatively, the method 300 may move from step 308 to step 309 regardless of the ratio change of the compressed volume of data. If the performance problem and the ratio change do not adversely affect the SAN 150, then the volume of data will not be uncompressed, and the method continues to step 302 for assessing a new volume of data. If the ratio change and the performance problem are adversely affecting the SAN 150, then step 310 may undeploy the compressed volume of data to determine which method or algorithm was used to initially compress the data. Step 311 determines whether the compressed volume of data was compressed at the virtualization layer 111 or the backend layer 113. If the compressed volume of data was compressed at the virtualization layer 111, then step 312 uncompresses the compressed data at the virtualization layer 111. If the compressed volume of data was compressed at the backend layer 113, then step 313 migrates the compressed volume of data to an uncompressed pool for decompression at the backend layer. The method 300 may continue at step 302 to assess a new volume of data.

Figure 5:
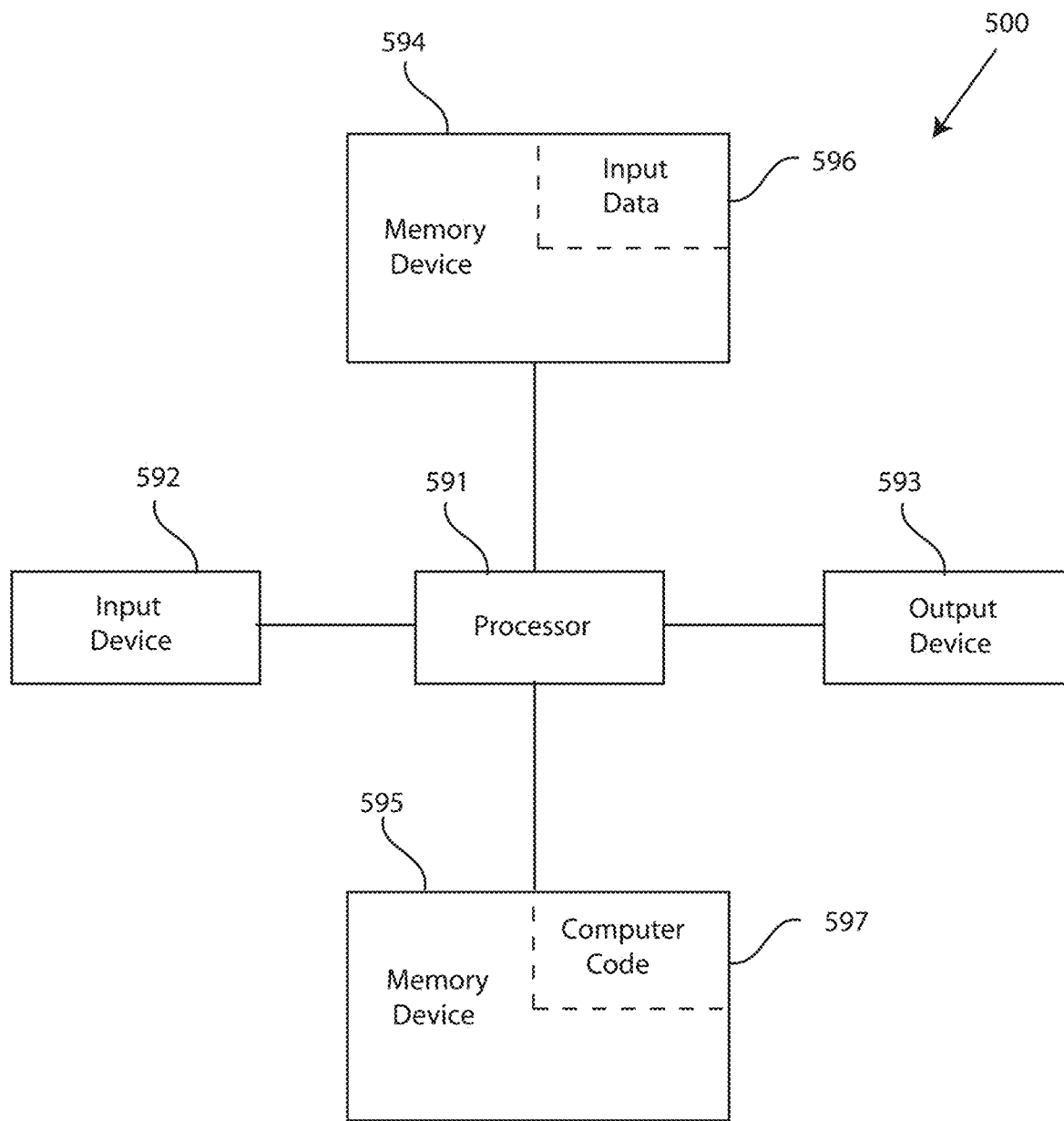
FIG. 5 depicts a block diagram of a computer system for the SAN data compression determination system of FIG. 1, capable of implementing methods for determining whether data compression should be performed at a storage virtualization layer or a backend layer, within a storage area network of FIGS. 3-4, in accordance with embodiments of the present invention.

FIG. 5 illustrates a block diagram of a computer system for the SAN data compression determination system of FIG. 1, capable of implementing methods for determining whether data compression should be performed at a storage virtualization layer or a backend layer, within a storage area network of FIGS. 3-4, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for determining whether data compression should be performed at a storage virtualization layer or a backend layer, within a storage area network, in the manner prescribed by the embodiments of FIGS. 3-4 using the SAN data compression determination system of FIG. 1, wherein the instructions of the computer code 597 may be executed by processor 591 via memory device 595. The computer code 597 may include software or program instructions that may implement one or more algorithms for implementing the methods for determining whether data compression should be performed at a storage virtualization layer or a backend layer, within a storage area network, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 5.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to SAN data compression determination systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to determine whether data compression should be performed at a storage virtualization layer or a backend layer, within a storage area network. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for determining whether data compression should be performed at a storage virtualization layer or a backend layer, within a storage area network. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for determining whether data compression should be performed at a storage virtualization layer or a backend layer, within a storage area network.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
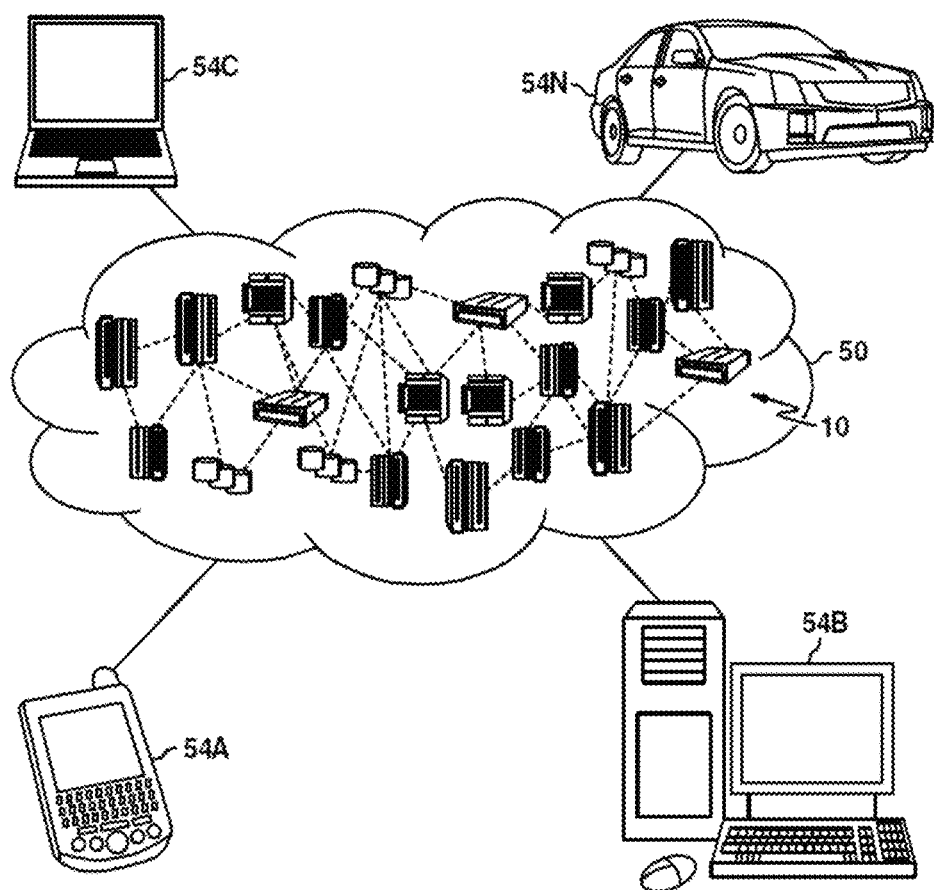
FIG. 6 depicts a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
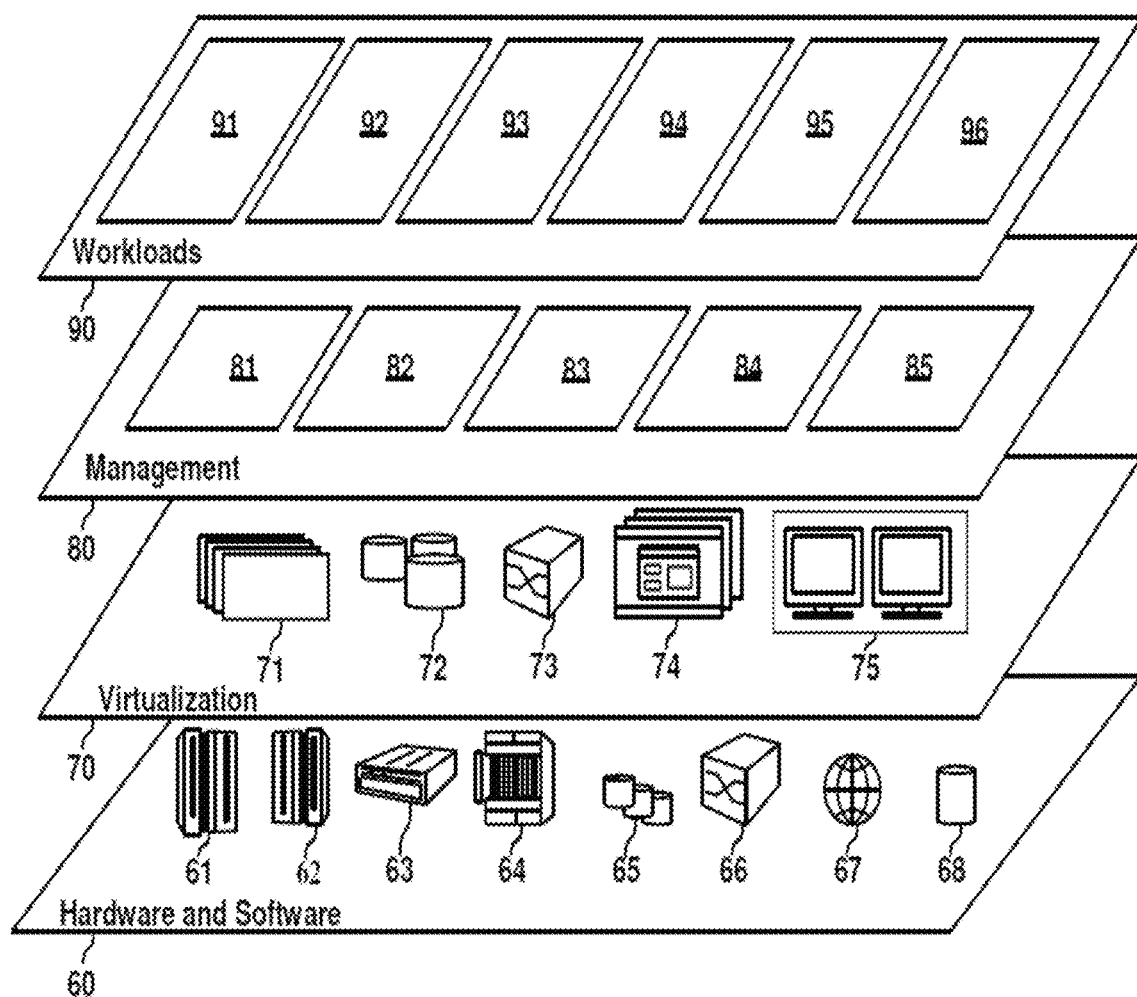
FIG. 7 depicts abstraction model layers, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and SAN data compression determination 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for determining whether data compression should be performed at a storage virtualization layer or a backend layer, within a storage area network, the method comprising:
   assessing, by a processor of a computing system, a volume of data to decide whether the volume of data should be compressed or is already compressed;
   in response to deciding that the volume of data should be compressed:
      checking, by the processor, whether a restriction exists on the volume of data;
      transforming, by the processor, the volume of data by compressing the volume at the storage virtualization layer of the storage area network when the restriction exists; and
      migrating, by the processor, the volume of data to a natively compressed pool for data compression at the backend layer of the storage area network when the restriction does not exist; and
   in response to deciding that the volume of data is already compressed:
      determining, by the processor, that the volume of data already compressed should be uncompressed based on at least one metric;
      uncompressing, by the processor, the volume of data already compressed at the storage virtualization layer when the volume of data already compressed was compressed at the storage virtualization layer of the storage area network; and
      migrating, by the processor, the volume of data already compressed to a natively uncompressed pool for uncompressing the volume of data already compressed at the backend layer of the storage area network when the volume of data already compressed was compressed at the backend layer.

2. The method of claim 1, wherein the assessing includes performing, by the processor, a policy assessment of the volume of data in accordance with compression policies stored in a compression policy database within the storage area network.

3. The method of claim 1, wherein deciding that the volume of data should be compressed includes:
   estimating, by the processor, a compression ratio of the volume of data; and
   determining, by the processor, that the compression ratio of the volume of data is below a predetermined threshold, wherein the compression ratio is a size of the compressed volume of data divided by a size of the uncompressed volume of data.

4. The method of claim 1, wherein the at least one metric is at least one of: a ratio change of the volume of data already compressed, and a performance problem of the volume of data already compressed.

5. The method of claim 1, wherein the restriction is a condition, that if the condition occurs, the volume of data cannot be compressed at the storage virtualization layer.

6. The method of claim 5, wherein the condition is at least one of: the volume of data is mirrored on another layer within the storage area network, the volume of data exceeds a predetermined data volume, the number of compressed data volumes at the virtualization layer exceeds the licensed maximum, the total size of compressed data volumes at the virtualization layer exceeds the recommended maximum for the virtualization hardware, performance monitoring of the virtualization layer has indicated it is at or above a predetermined loading threshold, and a combination thereof.

7. The method of claim 1, wherein the migrating the volume of data to a natively compressed pool for data compression at the backend layer including, sending, by the processor, a migration command to the virtualization layer, further wherein, when a maximum number of operations of the virtualization layer is reached, postponing, by the processor, sending another migration command to the virtualization layer.

8. A computer system, comprising:
a processor;
a memory device coupled to the processor; and
a computer readable storage device coupled to the processor, wherein the storage device contains program code executable by the processor via the memory device to implement a method for determining whether data compression should be performed at a storage virtualization layer or a backend layer, within a storage area network, the method comprising:
assessing, by a processor of a computing system, a volume of data to decide whether the volume of data should be compressed or is already compressed;
in response to deciding that the volume of data should be compressed:
checking, by the processor, whether a restriction exists on the volume of data;
transforming, by the processor, the volume of data by compressing the volume at the storage virtualization layer of the storage area network when the restriction exists; and
migrating, by the processor, the volume of data to a natively compressed pool for data compression at the backend layer of the storage area network when the restriction does not exist; and
in response to deciding that the volume of data is already compressed:
determining, by the processor, that the volume of data already compressed should be uncompressed based on at least one metric;
uncompressing, by the processor, the volume of data already compressed at the storage virtualization layer when the volume of data already compressed was compressed at the storage virtualization layer of the storage area network; and
migrating, by the processor, the volume of data already compressed to a natively uncompressed pool for uncompressing the volume of data already compressed at the backend layer of the storage area network when the volume of data already compressed was compressed at the backend layer.

9. The computer system of claim 8, wherein the assessing includes performing, by the processor, a policy assessment of the volume of data in accordance with compression policies stored in a compression policy database within the storage area network.

10. The computer system of claim 8, wherein deciding that the volume of data should be compressed includes:
estimating, by the processor, a compression ratio of the volume of data; and
determining, by the processor, that the compression ratio of the volume of data is below a predetermined threshold.

11. The computer system of claim 8, wherein the at least one metric is at least one of: a ratio change of the volume of data already compressed, and a performance problem of the volume of data already compressed.

12. The computer system of claim 8, wherein the restriction is a condition, that if the condition occurs, the volume of data cannot be compressed at the storage virtualization layer.

13. The computer system of claim 12, wherein the condition is at least one of: the volume of data is mirrored on another layer within the storage area network, the volume of data exceeds a predetermined data volume, the number of compressed data volumes at the virtualization layer exceeds the licensed maximum, the total size of compressed data volumes at the virtualization layer exceeds the recommended maximum for the virtualization hardware, performance monitoring of the virtualization layer has indicated it is at or above a predetermined loading threshold, and a combination thereof.

14. The computer system of claim 8, wherein the migrating the volume of data to a natively compressed pool for data compression at the backend layer including, sending, by the processor, a migration command to the virtualization layer, further wherein, when a maximum number of operations of the virtualization layer is reached, postponing, by the processor, sending another migration command to the virtualization layer.

15. A computer program product, comprising a computer readable hardware storage device storing a computer readable program code, the computer readable program code comprising an algorithm that when executed by a computer processor of a computing system implements a method for determining whether data compression should be performed at a storage virtualization layer or a backend layer, within a storage area network, the method comprising:
assessing, by a processor of a computing system, a volume of data to decide whether the volume of data should be compressed or is already compressed;
in response to deciding that the volume of data should be compressed:
checking, by the processor, whether a restriction exists on the volume of data; transforming, by the processor, the volume of data by compressing the volume at the storage virtualization layer of the storage area network when the restriction exists; and
migrating, by the processor, the volume of data to a natively compressed pool for data compression at the backend layer of the storage area network when the restriction does not exist; and
in response to deciding that the volume of data is already compressed:
determining, by the processor, that the volume of data already compressed should be uncompressed based on at least one metric;
uncompressing, by the processor, the volume of data already compressed at the storage virtualization layer when the volume of data already compressed was compressed at the storage virtualization layer of the storage area network; and
migrating, by the processor, the volume of data already compressed to a natively uncompressed pool for uncompressing the volume of data already compressed at the backend layer of the storage area network when the volume of data already compressed was compressed at the backend layer.

16. The computer program product of claim 15, wherein the assessing includes performing, by the processor, a policy assessment of the volume of data in accordance with compression policies stored in a compression policy database within the storage area network.

17. The computer program product of claim 15, wherein deciding that the volume of data should be compressed includes:
   estimating, by the processor, a compression ratio of the volume of data; and
   determining, by the processor, that the compression ratio of the volume of data is below a predetermined threshold.

18. The computer program product of claim 15, wherein the at least one metric is at least one of: a ratio change of the volume of data already compressed, and a performance problem of the volume of data already compressed.

19. The computer program product of claim 15, wherein the restriction is a condition, that if the condition occurs, the volume of data cannot be compressed at the storage virtualization layer.

20. The computer program product of claim 19, wherein the condition is at least one of: the volume of data is mirrored on another layer within the storage area network, the volume of data exceeds a predetermined data volume, the number of compressed data volumes at the virtualization layer exceeds the licensed maximum, the total size of compressed data volumes at the virtualization layer exceeds the recommended maximum for the virtualization hardware, performance monitoring of the virtualization layer has indicated it is at or above a predetermined loading threshold, and a combination thereof.

* * * * *